United States Patent Office 3,641,093
Patented Feb. 8, 1972

3,641,093
STABLE LIQUID DIPHENYLMETHANE DIISOCYANATES
Martin Frederick Brooks and Vincent Kerrigan, Manchester, England, assignors to Imperial Chemical Industries Limited, London, England
No Drawing. Filed Nov. 4, 1968, Ser. No. 773,338
Claims priority, application Great Britain, Dec. 12, 1967, 56,498/67
Int. Cl. C07c *119/04;* C08g *22/26*
U.S. Cl. 260—453 AR                    2 Claims

ABSTRACT OF THE DISCLOSURE

Polyisocyanate compositions comprising a diphenylmethane diisocyanate in which from 1% to 50% of the isocyanate groups have been reacted with a non-sterically hindered aromatic carbodiimide other than a carbodiimide derived from diphenylmethane diisocyanate.

---

This invention relates to isocyanate compositions produced by reacting diphenylmethane diisocyanate with carbodiimides and to a method of preparing such compositions.

Diphenylmethane diisocyanate often described as methylene bis-(phenyl isocyanate) is one of the isocyanates commonly used in the manufacture of polyurethanes. The diisocyanate is made by phosgenation of the diamine formed by condensation of aniline and formaldehyde and two forms of the isocyanate are normally manufactured. First the crude product made by phosgenation of the total amines obtained by condensation of aniline and formaldehyde in various proportions, which crude product is comprised of the diisocyanate together with higher polyfunctional isocyanates derived from higher polyamines formed in the aniline/formaldehyde condensation. The second form normally manufactured is the pure diisocyanate obtained by distillation of the crude product, an intermediate purification of the diamine, by distillation or some other method, also being employed if desired. The pure distilled product comprises mainly diphenylmethane-4,4'-diisocyanate with a few percent of the 2,4'-isomer.

The crude mixtures containing polyisocyanates of higher functionality are normally liquid at room temperature and, therefore, present little difficulty in handling in conventional polyurethane manufacturing machinery.

The pure product on the other hand presents a problem in that it is normally solid at room temperature and, therefore, has to be melted and kept in the molten state in order that it can be transferred by pumping through the piping of the polyurethane machinery and rapidly mixed with the other ingredients, normally liquids, of the polyurethane forming composition. Under these conditions, i.e. being maintained at 50° C.–60° C., diphenylmethane diisocyanate tends to spontaneously polymerise and precipitate quantities of the uretedione dimer.

It has now been found that a stable liquid diphenylmethane diisocyanate may be obtained by reacting from 1% to 50% of the isocyanate groups in a diphenylmethane diisocyanate with a non-sterically hindered aromatic carbodiimide, other than a carbodiimide derived from diphenylmethane diisocyanate. A composition obtained in this manner is a stable liquid which can be stored at room temperature for long periods without depositing solid matter and can be incorporated in polyurethane forming compositions without the necessity of heating.

Thus according to the present invention there are provided polyisocyanate compositions comprising a diphenylmethane diisocyanate in which from 1% to 50% of the isocyanate groups have been reacted with a non-sterically hindered aromatic carbodiimide other than a carbodiimide derived from diphenylmethane diisocyanate.

Preferred compositions of the present invention are those in which from 2% to 25% of the isocyanate groups in the diphenylmethane diisocyanate have been reacted with the carbodiimide.

Any diphenylmethane diisocyanate may be used in the compositions of the present invention, mixtures of isomers of any proportions may be used, distilled diphenylmethane-4,4'-diisocyanates prepared by normal procedures and containing up to about 10% of diphenylmethane-2,4'-diisocyanate are particularly suitable.

Any non-sterically hindered aromatic carbodiimides other than carbodiimides derived from diphenylmethane diisocyanate may be used for the compositions of this invention. By the term non-sterically hindered is intended carbodiimides in which there is no substituent in the ortho positions adjacent to the carbodiimide group in the aromatic ring. Thus for example in the case of a diphenyl carbodiimide of formula—

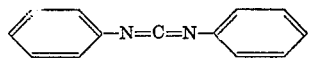

there must be no substituents ortho to the nitrogen atoms.

The aromatic groups present in the carbodiimide may be any such groups substituted or unsubstituted providing they have no substituent ortho to the carbodiimide nitrogen atom. Examples of substituent groups include hydrocarbyloxy groups, alkyl groups, aralkyl groups which may themselves be substituted, aryl groups which may themselves be substituted, halogen, nitro, carboxyester and isocyanate groups.

Examples of non-sterically-hindered carbodiimides include those of the general formula—

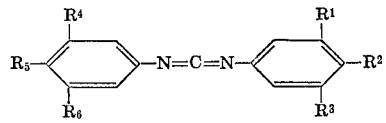

wherein $R^1$, $R^2$, $R^3$, $R^4$, $R^5$, and $R^6$ represent hydrogen, hydrocarbon, hydrocarbyloxy, halogen, nitro, carboxyester, isocyanate or substituted hydrocarbon groups.

Specific examples of non-sterically hindered carbodiimides include— di-p-tolyl carbodiimide,
diphenyl carbodiimide,
di-β-naphthyl carbodiimide,
bis-(3-isocyanato-4-methyl-phenyl) carbodiimide,
di-p-chlorophenyl carbodiimide,
di-m-chlorophenyl carbodiimide, and
bis-(4-chloro-3-isocyanato phenyl) carbodiimide.

Carbodiimide made by contacting polyisocyanate with suitable catalyst at elevated temperature may also be used.

Monomeric or polymeric carbodiimides such as are often obtained from polyisocyanates, may be used.

Carbodiimides which are not used are those derived from diphenylmethane diisocyanates, i.e. those derived by heating the diphenylmethane diisocyanate at elevated temperatures with or without a catalyst.

The compositions of the present invention are made by mixing together the diphenylmethane diisocyanate and the carbodiimide and allowing the compounds to react. Although reaction takes place at room temperature it is preferred that the mixture be heated in order to increase the speed of reaction. It is preferred that the composition be formed by heating the mixture at a temperature of from 40° C. to 150° C. Higher temperatures are undesirable due to the possibility of side-reaction and it is particularly important that the reaction should be carried out below the temperature at which the diisocyanate decomposes with formation of carbon-dioxide and a carbodiimide, i.e. about 150° C.

The compositions may be made by simply reacting the two substances together alone, or a solvent may be employed if desired and removed after the reaction.

Although an understanding of the chemistry involved is not essential to our invention it is believed that uretonimines formed by addition of an isocyanate group to one of the double bonds of the carbodiimide are present in the compositions of the present invention.

The compositions are mobile liquids at room temperature which show little or no signs of crystallisation or deposition of solid for many weeks and are satisfactory isocyanates for incorporation by standard methods with other polyurethane forming materials such as polyethers, polyesters etc. They are useful in the manufacture of polyurethanes which may be in the form of cast products, foams, elastomers, surface coatings or fibres.

The invention is illustrated but not limited by the following examples in which all parts are by weight except where otherwise indicated.

EXAMPLE 1

190 parts of essentially pure 4:4′-diisocyanatodiphenyl methane (containing 1% of the 2:4′-isomer) are melted with exclusion of water, in a water bath maintained at 50° C. 10 parts of di-p-tolyl carbodiimide are added and the mixture stirred at 50° C. for 2 hours and then allowed to cool to room temperature.

The product is a slightly cloudly, water white mobile liquid which shows no signs of crystallisation or deposition of solid on storage above 15° C. for several weeks. The slight cloudiness may be removed by filtration or by centrifuging if desired.

EXAMPLE 2

180 parts of essentially 4,4′ - diisocyanato diphenyl methane (containing 1.5% of the 2,4′-isomer) are melted with exclusion of moisture at 50° C. 20 parts of di-p-tolyl carbodiimide are added and the mixture stirred at 50° C. for 2 hours and then allowed to cool to room temperature.

The product is a clear water white mobile liquid which shows no signs of crystallisation or deposition of solid on storage at 15° C. for several weeks.

EXAMPLE 3

180 parts of essentially 4,4′-diisocyanato diphenyl methane (containing 1% of the 2,4′-isomer) are melted with exclusion of moisture at 50–60° C. 20 parts of diphenyl carbodiimide are added and the mixture stirred at 50–60° C. for 2 hours and then allowed to cool to room temperature.

The product is a slight cloudy, water white mobile liquid, which after decantation from a small amount of solid shows no signs of crystallisation or deposition of solid on storage at 15° C. for several weeks.

EXAMPLE 4

180 parts of essentially pure 4,4′-diisocyanato diphenyl methane (containing 1% of the 2,4′-isomer) are melted with exclusion of moisture at 50–60° C.

20 parts of di-p-chlorophenyl carbodiimide are added and the mixture stirred at 50–60° C. for two hours and then allowed to cool to room temperature.

The product is a slightly cloudy, off white mobile liquid, which after decantation from a small amount of solid shows no signs of crystallisation or deposition of solid on storage at 15° C. for several weeks.

We claim:

1. A stable liquid polyisocyanate composition comprising distilled diphenylmethane-4,4′-diisocyanate containing up to about 10% of diphenylmethane-2,4-diisocyanate and in which from 1% to 50% of the isocyanate groups have been reacted with a nonsterically hindered aromatic carbodiimide selected from the group consisting of diphenyl and di-β-naphthyl carbodiimides at a temperature of from 40° C. to 150° C., said aromatic carbodiimide being free from isocyanate-reaction substituents.

2. A composition as claimed in claim 1 wherein from 2% to 25% of the isocyanate groups in the diphenylmethane diisocyanate have been reacted with the carbodiimide.

References Cited

UNITED STATES PATENTS 3,065,224  11/1962  Hofmann et al. ____ 260—453 X
3,152,162  10/1964  Fisher et al. _____ 260—453

CHARLES B. PARKER, Primary Examiner

D. H. TORRENCE, Assistant Examiner

U.S. Cl. X.R.

260—77.5 AT, 239 A, 453 P, 453 SP